United States Patent Office 3,435,874
Patented Apr. 1, 1969

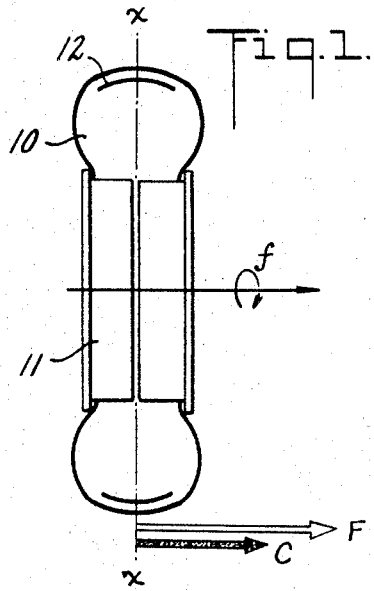
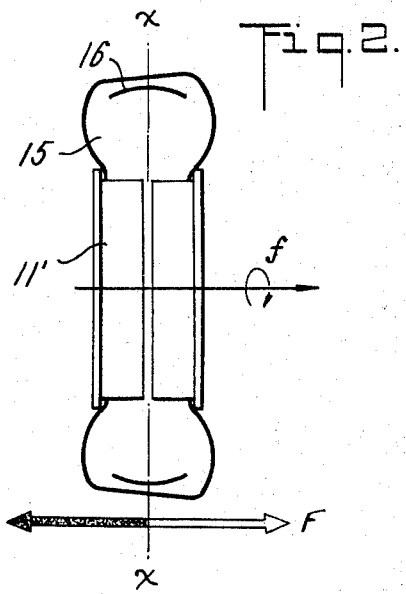
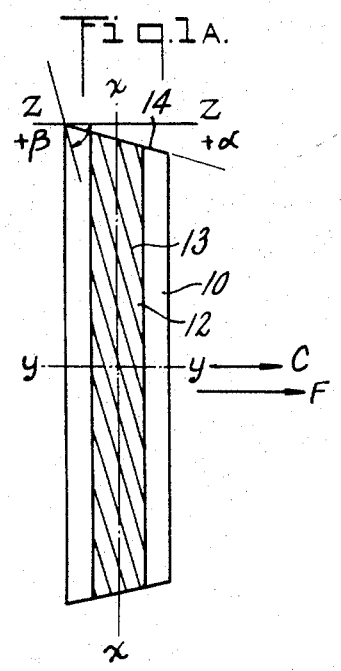
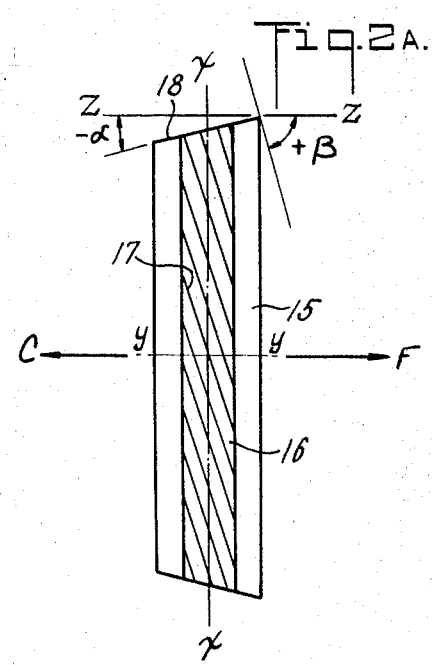

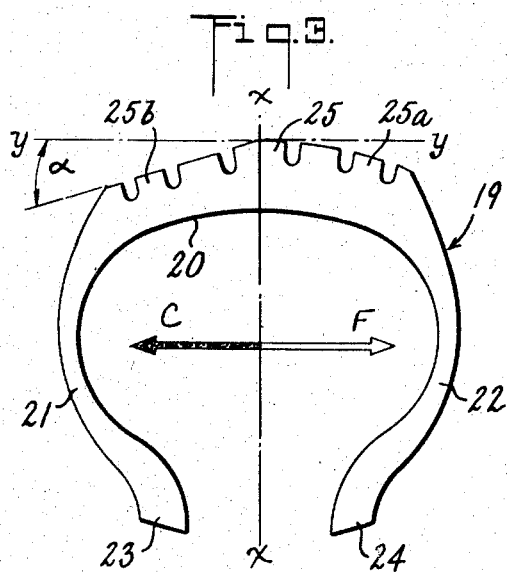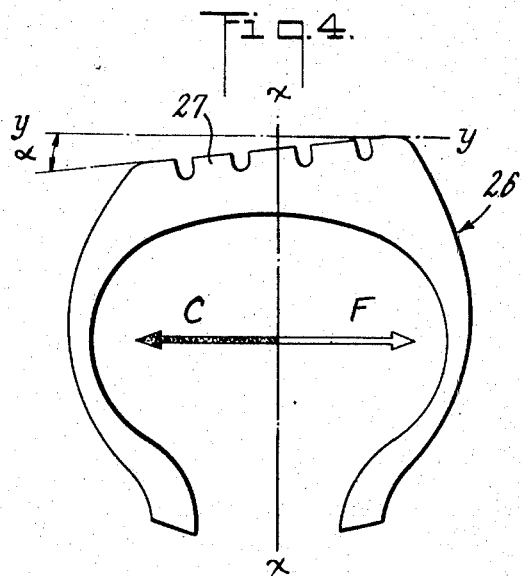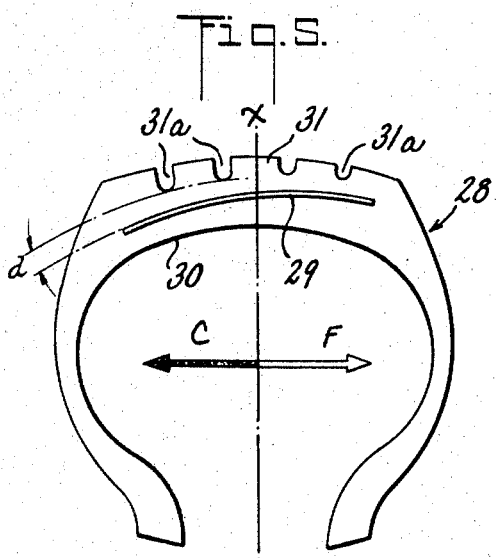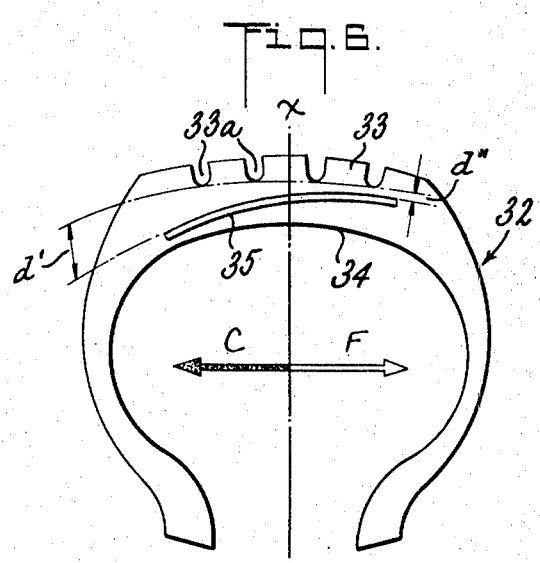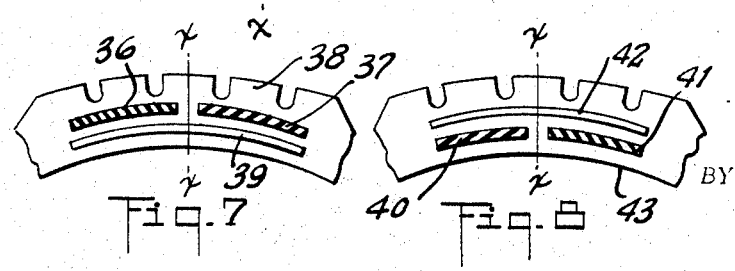

3,435,874
ASYMMETRIC TIRES
Henri Mirtain and André Devienne, Compiegne, France, assignors to Societe Francaise du Pneu Englebert, Margny-les-Compiegne, France, a corporation of France
Filed May 24, 1966, Ser. No. 552,473
Claims priority, application France, June 1, 1965, 19,084
Int. Cl. B60c 5/00, 9/00, 11/00
U.S. Cl. 152—352                10 Claims

ABSTRACT OF THE DISCLOSURE

A belted radial ply pneumatic tire having a deliberate degree of asymmetry incorporated in its tread region to provide a force of conicity which is directed laterally of the median equatorial plane of the tire and, when the tire is in service on a normally forward moving vehicle, is vectorially opposite to the tire's lateral force of structure resulting from the bias angle at which the cords in the radially outermost region of the breaker are oriented relative to the median equatorial plane of the tire. The type of asymmetry chosen is such as to enable at least a portion of the tread to make an angle other than 90° with the median equatorial plane, the latter being considered perpendicular to the ground.

---

This invention relates to pneumatic tires for vehicles, and more particularly to the type of tires generally called radial or radial ply tires.

The expressions "radial tires" and "radial ply tires" as commonly used in the pneumatic tire art may be said to include various tire constructions having one or more reinforcement plies of weftless cord fabric extending from bead to bead wherein the cords in each ply are substantially radial in orientation, i.e. the cords are oriented substantially normal to the beads and the crown centerline of the tire. In a monoply radial tire construction, the cords normally have a 90° bias angle, i.e. in the unshaped carcass they extend perpendicular to the planes of the beads. In a two-ply radial tire construction, the cords in each body ply are usually oriented at oppositely disposed small angles of up to 10° with respect to the perpendicular to the bead planes, in which case the respective body plies are said to have oppositely disposed bias angles of 80° or greater (but less than 90°). In four-ply or heavier radial tire constructions, similar opposed orientation of the cords in successive body plies is usually employed. All of these body or carcass constructions are contemplated within the scope and meaning of the expressions "radial" and "substantially radial" as used herein.

Radial tires also generally have a breaker or belt interposed between the tread and the crown region of the carcass, such breaker being comprised of one or more plies of usually weftless cord fabric. In such a breaker, the cords are made of generally inextensible materials, e.g. metallic wires, glass filaments, polyester filaments, etc., and have a relatively low bias angle (see for example Cooper U.S. Patent No. 2,826,233 and Mirtain U.S. Patent No. 3,242,965), i.e. they are oriented substantially circumferentially of the tire. If the breaker is a multi-ply structure, similar but opposed orientations of the cords in successive plies are employed.

The present invention stems from the recognition of the fact that tires are not always rigorously uniform. That is to say, tires are found to have both radial and lateral variations in uniformity. Even without taking into account the radial and lateral eccentricity resulting from generally accepted tolerances in the wheel rims on which tires are mounted, therefore, these variations in the uniformity of the tire cause the tire and rim combination viewed as a whole to have variations of radial and lateral forces. This applies even in the case of radial ply tires equipped, as previously stated, with a breaker or belt incorporated between the crown region of the carcass and the surrounding tread band.

We have now discovered that apart from the above-mentioned variations in uniformity resulting from the structure and manufacture of the tire, an effective lateral force on the tire may also exist due to the reaction between the tire and the ground. This force, which will hereinafter be referred to as the lateral slip force, generally has two components, (a) a force due to the structure of the tire itself, hereinafter designated by the term "force of structure" and symbol F, and (b) a force resulting from the geometry of the tire, herein after designated by the term "force of conicity" and symbol C.

The force of structure F, for a given direction of rotation of the tire, is always directed in the same lateral direction relative to its median equatorial plane irrespective of the direction of mounting of the tire on the wheel rim, by virtue of the orientation of the generally inextensible metal wires or other cord elements of the radially outermost ply of the breaker, i.e. the ply thereof nearest the tread. The lateral force of conicity C in a standard radial tire, however, for the given direction of rotation thereof may be directed sometimes in one direction and sometimes in another, depending on the direction of mounting of the tire.

The total lateral force L thus is given by the relation (1)  $L = (\pm F) + (\pm C)$ from which it will be seen that if for a given (say, the positive) direction of rotation of the tire, achieved by a forward movement of the vehicle, both the force of structure F and the force of conicity C are positive, the total lateral force is (2)  $L = +F + (+C) = F + C$ Thus, the effects of the two forces are added. In the reverse (i.e. the negative) direction of rotation of this same tire, achieved by a forward vehicle movement with the direction of mounting of the tire reversed, the force of structure F is still positive, but the force of conicity C is now negative, whereby the resultant, i.e. the total lateral force, is expressed by the relation (3)  $L = +F + (-C) = F - C$ L thus is lower when the tire rotates in the second case than when it rotates in the first case.

We have further discovered that the total lateral slip force L is an important factor in the cornering power of the vehicle on which such tires are mounted. Thus, for example, if at the front of such a vehicle the sum of the lateral forces of the two tires, which sum may be expressed as 2L, exceeds a certain value, the vehicle tends to pull to the right or to the left depending on the direction of L, i.e. the vehicle tends to over-steer or under-steer.

It is an object of the present invention, therefore, to provide means enabling such potential disadvantage to be avoided.

A more specific object of the present invention is the provision of novel constructions of radial ply tires, as well as novel methods of manufacturing such tires, by means of which the force of structure F of each tire is effectively counteracted at all times by the force of conicity C of the same tire.

Generally speaking, these objectives of the invention are achieved by building the tire in such a way that with the force of structure F for a forward or normal driving movement of the vehicle always directed in a single lateral direction, i.e. positive or negative, regardless of the actual direction of mounting of the tire on the wheel rim, the force of conicity is always vectorially opposite to the force F for the same direction of movement of the vehicle. The sufficient condition is then expressed by the relation.

(4)  $L=(\pm F)+(\pm C)=0$ although it might be preferable if the magnitude of C were somewhat greater than the magnitude of F.

In accordance with our invention, this objective is basically attained by the provision of means in the tire, constituting a part of the structure thereof, to establish an asymmetry of the geometry of the tire which, with reference to the medial equatorial plane of the tire, is sufficient to superimpose thereon a predetermined oriented lateral slip force, i.e. oriented in direction opposite to that of the force of structure F, in combination with means for indicating the manner in which the tire should be mounted to achieve the desired opposition of the forces of structure and conicity during normal forward driving movement of the vehicle.

We are, of course, aware of the fact that asymmetrical tire constructions have heretofore been proposed for various reasons. We believe, however, that all such known constructions have been devised without any consideration of the relationship between the force of conicity C and the force of structure F, and in particular have not in any way been devised to create a deliberately chosen force of conicity C vectorially opposite to the force of structure F through the creation of a predetermined eccentricity of the tread and breaker region of a tire.

Basically, a tire according to the present invention, which includes a radial ply carcass, a tread, a breaker forming the reinforcement for the tread, and two sidewalls, is characterized by the face that these elements are arranged in such a manner that the ground-contacting surface of the tread has a tendency to form an angle appreciably different from 90° with the median equatorial plane of the wheel on which this tire is mounted, it being assumed for the purposes of this definition that said plane is perpendicular to the ground. As a related aspect of the invention, such a tire is designed and specified, i.e. it is marked or indicated, to be used only for a predetermined normal direction of rotation, in order to ensure that the lateral inclination of the contact surface as described is always so oriented as to generate a force of conicity C acting in a direction opposite to that of the force of structure F.

More specifically, in accordance with one aspect of the present invention, the foregoing objectives may be achieved by molding the tire so as to impart an essentially conical shape to all or part of the tread surface thereof. In accordance with another aspect of the present invention, the breaker may be given an essentially conical shape in such a manner as to admit of a greater deformation of the tread on one side of the tire than on the other. According to yet another aspect of the present invention, the action of such a conical breaker may be supplemented by the provision of treated grooves which increase in depth from one side of the tread to the other. According to still another aspect of the present invention, the desired differential tread deformation effect may be achieved by the provision of lateral cushions interposed either between the breaker and the tread or between the breaker and the carcass, the cushion at one side being made of a material less hard than that of which the cushion on the opposite side is made. In all of these variants, the tire is provided with means indicating the required manner of mounting thereof for the purpose aforesaid.

The foregoing and other objects, characteristics and advantages of the present invention will be more clearly understood from the following detailed description when read in conjunction with the accompanying drawings, in which:

FIGS. 1 and 2 are schematic illustrations of wheel-mounted radial ply tires and also graphically depict the respective orientations of the forces of structure and conicity thereof, FIG. 1 in the case of a tire with non-oriented lateral slip, and FIG. 2 in the case of a tire with oriented lateral slip according to the present invention;

FIGS. 1A and 2A are diagrammatic illustrations of the relationships between the breaker cord bias angle and the geometrical asymmetry of the types of tires shown in FIGS. 1 and 2, respectively;

FIG. 3 is a diagrammatic, transverse or radial section through a tire provided, in accordance with one aspect of the present invention, with a tread the surface of which has a predetermined conical shape over one-half of its expanse;

FIG. 4 is a similar view of a tire the tread surface of which, in accordance with another aspect of the invention, has a conical shape over its entire expanse;

FIGS. 5 and 6 are similar views of tires provided, in accordance with still other aspects of the invention, with conically shaped breakers; and FIGS. 7 and 8 are fragmentary similar views showing the tread regions of tires provided, in accordance with further aspects of the invention, with cushions of different hardnesses in association with the breakers.

Referring now to the drawings in greater detail, as previously explained the implementation of the present invention requires that for a specified normal direction of rotation of a tire, which for the purpose of discussion may be taken to be the forward direction $f$ illustrated by the curved arrows in FIGS. 1 and 2, the force of conicity C resulting from the imposition of a deliberate geometrical asymmetry should effectively be directed opposite to the force of structure F generated at least in part by the angular orientation of the breaker cords. In FIG. 1, a standard radial ply tire 10 having no predetermined oriented side slip and mounted on a wheel rim 11 is, in the fashion of radial tires in general, provided with a breaker 12 in the radially outermost portion of which, i.e. in the outermost ply if the breaker is a multi-ply structure, the generally inextensible reinforcing cords 13 of metallic wire, fiberglass, polyester and the like are oriented at an angle $\beta$ (see FIG. 1A) to the meridian, i.e. a radial plane, of the tire which is designated $y$—$y$ in FIG. 1A and is perpendicular to the median equatorial plane of the tire designated $x$—$x$ in FIG. 1A. It is this orientation of the breaker cords, inter alia, which, when the tire rolls over the ground, gives rise to the force of structure F which is laterally directed, for example to the right, which is here termed the positive direction. For the sake of consistency, therefore, the angle $\beta$ is also considered to be positive, but it should be understood that the breaker cord orientation shown in FIG. 1A, i.e. from the lower right to the upper left, is that of the cords at the top of the tire when one looks down upon it. An illustration of the cords at the rod-engaging "foot-print" portion of the tire would actually have to show the cords as extending obliquely crosswise to those shown in FIG. 1A, i.e. angled from the lower left to the upper right. It will further be understood that the force of structure F will be directed as shown only when the tire rotates in the direction $f$, independently of the direction of mounting of the tire, and will be reversed when the direction of tire rotation is reversed.

In the absence of any prescribed measures, the tire 10 may also have in inherent geometrical asymmetry resulting from the manner of building of the tire, which for purposes of illustration only is represented in FIG. 1A by the existence of a conical shape of the tread 14 so that the surface thereof is oriented at an angle $\alpha$ with respect to the ground, represented by the line $z$—$z$, essentially codirectionally with the angle $\beta$. In the same frame of reference, therefore, the angle $\alpha$ may also be termed positive. Upon rotation of the tire, the asymmetry thereof causes the laterally directed force of conicity C to be generated, and the direction of this force is independent of the direction of rotation of the tire but is reversed when the direction of mounting of the tire is reversed. Thus, since in the case of normal rotation of the tire in the direction $f$ the asymmetry resulting from the presence of the angle $\alpha$ generates in the rotating tire a lateral force of conicity C directed in the same direction as the force of structure F, the two forces are additively combined, giving a completely uncontrolled total lateral force $L=F+C$ directed to one side of the tire.

Referring now to FIG. 2, the tire 15 there shown on a wheel rim 11' is provided with a breaker 16 in which the cords 17 (FIG. 2A) in the outermost ply are also oriented at a positive angle $\beta$ to the meridian plane $y-y$. The tire 15, however, is built so as to have a deliberately chosen asymmetry of its geometry sufficient to produce a force of conicity C which for the normal forward direction of rotation is vectorially opposite to the force of structure F. In FIG. 2A, this is represented by the conical shape of the tread surface 18 which is oriented at an angle $\alpha$ to the ground, again represented by the line $z-z$ this angle being considered negative since it is in a sense opposite to that of the breaker cord angle. As previously indicated herein, the geometrical asymmetry of the tire construction according to the present invention is so predetermined, by a suitable choice of the magnitude of the angle $\alpha$ in one sense relative to the magnitude of the angle $\beta$ in the opposite sense, that the force of conicity C is vectorially opposite to and counteracts the force of structure F, whereby the lateral slip force is $L=F-C$. To provide a fully controlled force L, therefore, it is preferred that the magnitude of C be at least equal to and if desired somewhat greater than the magnitude of F.

The practical attainment of this result may follow either from the provision of a tread having a surface suitably shaped, or from the provision of a tread reinforcement structure so designed as to enable the tread to be preferentially deformed, to the end that the tread surface has a tendency to make an angle with the median equatorial plane $x-x$ other than 90°, the said plane being assumed to be perpendicular to the ground.

Thus, referring to FIG. 3, the tire 19 there shown has a carcass 20 of the radial ply type (details not shown), sidewalls 21 and 22 terminating in beads 23 and 24, a tread 25 and a breaker (not shown) interposed between the crown region of the carcass and the tread. According to this aspect of the invention, the tire is molded so that the portion 25a of the tread to one side (the "positive" side) of the median equatorial plane $x-x$ has a standard configuration, while the portion 25b of the tread located on the other (the "negative") side of plane $x-x$ has an essentially conical shape with its road-contacting surface oriented at an angle $\alpha$ to the ground (line $z-z$). The tire 26 shown in FIG. 4 differs from the tire 19 only in that the road-contacting surface of its tread 27 has a substantially conical shape over its entire expanse and makes an angle $\alpha$ with the ground. In both cases, therefore, since $z-z$ is assumed to be perpendicular to the median equatorial plane $x-x$ of the tire, the angle $\alpha$ between the conical tread surface and the plane $x-x$ is less than 90° in the negative direction, giving rise to the force of conicity C of a magnitude and direction sufficient to effectively counteract the force of structure F. For obvious reasons, of course, it will be understod that the angle $\alpha$ in the case of the tire 26 need not be as large as the angle $\alpha$ in the case of the tire 19.

The same result may be obtained without recourse to the expedient of asymmetrical molding of the tire in the manner shown in FIGS. 3 and 4, in tires having generally conventional contours. In such a case, however, the tires must be modified structurally so as to enable an effective inclination or deformation of the tread surface during its contact with the ground in such a way as to create the same effect as the conical shaping of the treads shown in FIGS. 3 and 4. Thus, referring to FIG. 5, the tire 28 there shown has a generally conically shaped breaker 29 interposed between the crown area of the carcass 30 and the surrounding tread 31 in such a way as to be not parallel to the tread surface while nevertheless remaining at a constant spacing $d$ from the tangent to the bottoms of the tread grooves 31a which, of course, requires the grooves to be of increasing depth from one side of the tire to the other. Alternatively, as shown in FIG. 6, the tire 32 having basically the same body construction as the tire 28, is provided between the tread 33 and the carcass 34 with a generally conically shaped breaker 35 the distance between which and the tangent to the bottoms of the constant-depth tread grooves 33a increases from one side of the tire to the other, i.e. so that the spacing $d'$ is greated than the spacing $d''$.

In accordance with still other aspects of the present invention, the desired asymmetry and resultant generation of vectorially opposite forces C and F as herein contemplated could be achieved by incorporating in a radial tire of otherwise standard construction lateral cushion of suitable rubber or reinforced rubber materials, such cushions, designated 36 and 37 in FIG. 7, being placed between the tread 38 and the breaker 39, or alternatively, as shown at 40 and 41 in FIG. 8, between the breaker 42 and the carcass 43, with the cushions to one side of the median equatorial plane $x-x$ being of a different hardness than the cushions on the other side of said plane. Such an arrangement would make it possible for the breaker to assume, when the tire is in use, an appropriately oblique position with respect to its initial position, due to the difference in the respective hardnesses of the associated cushions.

In any of the constructions according to the present invention, of course, means will have to be provided on or in association with the tire for indicating to the user the manner in which the tire should be mounted on a vehicle, to ensure that upon forward movement of the vehicle the direction of the force of conicity C of each tire is vectorially opposite to the direction of its force of structure F.

It is to be understood that the foregoing description is illustrative only, and that the various tire constructions disclosed herein are susceptible to a number of variations and modifications none of which involves a departure from the spirit of the present invention as defined in the hereto appended claims.

Having thus described our invention, what we claim and desire to secure by Letters Patent is:

1. A pneumatic tire, comprising a radial ply carcass, a tread surrounding the crown region of said carcass, a breaker interposed between said tread and said carcass, said breaker being substantially coextensive with said crown region and comprised at its radially outermost region of generally inextensible tire cords oriented at a predetermined bias angle to the median equatorial plane of the time and imparting to the latter, when the same is in service on a moving vehicle, a lateral force of structure the direction of which, with reference to said plane, is dependent on the direction of rotation of the tire but independent of the direction of mounting thereof on the vehicle wheel rim, first means constituting in a part of the structure of the tire to establish in the tread region thereof a predetermined deliberate asymmetry of its geometry enabling the road-contacting surface of said tread to make an angle other than 90° with said median equatorial plane, the latter being considered perpendicular to the ground, thereby to impart to the tire, when in service on a moving vehicle, a lateral force of conicity the direction of which, with reference to said plane, is dependent on the direction of mounting of the tire on the wheel rim but independent of the direction of rotation of the tire, and second means associated with the tire for indicating the manner in which the tire should be mounted for use on a vehicle so as to ensure that upon forward movement of the vehicle the direction of said force of conicity of the tire is in a sense vectorially opposite to that of its force of structure.

2. A pneumatic tire according to claim 1, said first means comprising a conical shape of said tread over at least a part of the expanse of said road-contacting surface thereof.

3. A pneumatic tire according to claim 1, said first means comprising a conical shape of said tread over substantially the entire expanse of said road-contacting surface thereof.

4. A pneumatic tire according to claim 1, said first means comprising a conical shape of said thread over that part of the expanse of said road-contacting surface thereof located to one side of said median equatorial plane.

5. A pneumatic tire according to claim 1, said first means comprising a conical shape of said breaker to admit of a greater deformation of said tread at one side thereof than on the other.

6. A pneumatic tire according to claim 5, said tread having grooves increasing in depth from one side of said tread to the other, said breaker being of such conical shape as to be at a constant spacing from the tangent to the bottoms of the tread grooves.

7. A pneumatic tire according to claim 5, said tread having grooves of constant depth from one side of said tread to the other, said breaker being of such conical shape as to be at a spacing from the tangent to the bottoms of the tread grooves which increases from one side of said tread to the other.

8. A pneumatic tire according to claim 1, said first means comprising at least one lateral cushion located between said carcass and said tread within a lateral region of the latter and said breaker to establish on one side of the tire a tread region of a different hardness and resistance to deformation than the tread region on the other side of the tire.

9. A pneumatic tire according to claim 1, said first means comprising lateral cushions located between said breaker and said tread at the opposite sides of the tire, one of said cushions being made of a material less hard than the material of which the other cushion is made, thereby to establish on one side of the tire a tread region of a different hardness and resistance to deformation than the tread region on the other side of the tire.

10. A pneumatic tire according to claim 1, said first means comprising lateral cushions located between said breaker and said carcass at the opposite sides of the tire, one of said cushions being made of a material less hard than the material of which the other cushion is made, thereby to establish on one side of the tire a tread region of a different hardness and resistance to deformation than the tread region on the other side of the tire.

References Cited

UNITED STATES PATENTS

| | | | |
|---|---|---|---|
| 2,281,359 | 4/1942 | Kenner | 152—352 |
| 3,162,229 | 12/1964 | Ellenrieder | 152—209 |
| 3,176,748 | 4/1965 | Giebhart | 152—209 |
| 3,231,000 | 1/1966 | Massoubre | 152—361 |

FOREIGN PATENTS 1,254,263  1/1961  France.

ARTHUR L. LA POINT, *Primary Examiner.*

CHARLES B. LYON, *Assistant Examiner.*